US011481702B1

(12) United States Patent
Uriarte

(10) Patent No.: US 11,481,702 B1
(45) Date of Patent: Oct. 25, 2022

(54) WORKSITE INFORMATION MANAGEMENT SYSTEM

(71) Applicant: MiView Integrated Solutions, LLC, Carrollton, TX (US)

(72) Inventor: Luis A. Uriarte, Frisco, TX (US)

(73) Assignee: MiView Integrated Solutions, LLC, Carrollton, TX (US)

( * ) Notice: Subject to any disclaimer, the term of this patent is extended or adjusted under 35 U.S.C. 154(b) by 0 days.

(21) Appl. No.: 17/351,982

(22) Filed: Jun. 18, 2021

Related U.S. Application Data

(60) Provisional application No. 63/208,739, filed on Jun. 9, 2021, provisional application No. 63/040,908, filed on Jun. 18, 2020.

(51) Int. Cl.
G06Q 10/06 (2012.01)
G06Q 50/08 (2012.01)
G06Q 10/08 (2012.01)
G06Q 10/10 (2012.01)

(52) U.S. Cl.
CPC ........... G06Q 10/063114 (2013.01); G06Q 10/063116 (2013.01); G06Q 10/063118 (2013.01); G06Q 10/0875 (2013.01); G06Q 10/103 (2013.01); G06Q 50/08 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,406,432 B1* | 7/2008 | Motoyama | ............ | G06Q 10/06 705/7.16 |
| 9,424,545 B1* | 8/2016 | Lee | ................ | G06Q 10/063114 |
| 11,106,331 B1* | 8/2021 | Porter | .................. | G06F 3/0482 |
| 2007/0288334 A1* | 12/2007 | Creedle | ............ | G06Q 10/06315 705/35 |
| 2009/0018889 A1* | 1/2009 | Petersen | ................ | G06Q 10/10 705/7.37 |
| 2012/0330849 A1* | 12/2012 | Nielsen | .................. | G06Q 10/20 705/301 |

(Continued)

FOREIGN PATENT DOCUMENTS

| | | | | |
|---|---|---|---|---|
| CA | 2729590 A1 * | 12/2009 | ............ | G06Q 10/06 |
| CN | 109120903 A * | 1/2019 | | |
| WO | WO-2016064346 A1 * | 4/2016 | ............ | G06Q 10/06 |

OTHER PUBLICATIONS

T. Vilkko, T. Kallonen and J. Ikonen, "Mobile fieldwork solution for the construction industry," 2008 16th International Conference on Software, Telecommunications and Computer Networks, 2008, pp. 269-273, doi: 10.1109/SOFTCOM.2008.4669493. (Year: 2008).*

Primary Examiner — Crystol Stewart
(74) Attorney, Agent, or Firm — Ferguson Braswell Fraser Kubasta PC

(57) ABSTRACT

A method implements a worksite information management system. A selection that includes a task block is received. A task corresponding to a worksite is updated to include the task block. The task is presented to one of a worker interface, a trade interface, and a builder interface. An update to the task block is received. The task is updated using the update to generate an updated task. The updated task is presented to one of the trade interface and the builder interface.

26 Claims, 14 Drawing Sheets

(56) References Cited

U.S. PATENT DOCUMENTS

| | | | |
|---|---|---|---|
| 2014/0343987 A1* | 11/2014 | Harris | G06Q 10/0875 |
| | | | 705/7.15 |
| 2017/0185932 A1* | 6/2017 | Hynds | G06Q 10/06313 |
| 2019/0005719 A1* | 1/2019 | Fleischman | G06T 7/579 |
| 2019/0018850 A1* | 1/2019 | Bartz | G06F 3/0481 |
| 2020/0019907 A1* | 1/2020 | Notani | G06Q 10/063116 |
| 2020/0265256 A1* | 8/2020 | Ozawa | G06T 7/20 |
| 2020/0413011 A1* | 12/2020 | Zass | G06V 20/176 |
| 2021/0295040 A1* | 9/2021 | Takeno | G06V 20/40 |
| 2021/0319379 A1* | 10/2021 | Martinez | G06F 16/9035 |
| 2021/0326814 A1* | 10/2021 | Schulman | G06Q 10/0639 |

\* cited by examiner

WORKSITE INFORMATION MANAGEMENT SYSTEM

CROSS REFERENCE TO RELATED APPLICATIONS

This application claims the benefit of U.S. Provisional Application 63/040,908, filed Jun. 18, 2020, and U.S. Provisional Application 63/208,739, filed Jun. 9, 2021, which are each incorporated by reference herein.

BACKGROUND

Worksite information management systems track and process information about worksites. Worksite information management systems create, schedule, and track tasks and milestones. A challenge is to communicate relevant information to the different types users, which include workers, supervisors, builders, inspectors, etc.

SUMMARY

In general, in one or more aspects, the disclosure relates to a method that implements a worksite information management system. A selection that includes a task block is received. A task corresponding to a worksite is updated to include the task block. The task is presented to one of a worker interface, a trade interface, and a builder interface. An update to the task block is received. The task is updated using the update to generate an updated task. The updated task is presented to one of the trade interface and the builder interface.

In general, in one or more aspects, the disclosure relates to a system that includes a server that includes an application that executes on the server. A selection that includes a task block is received. A task corresponding to a worksite is updated to include the task block. The task is presented to one of a worker interface, a trade interface, and a builder interface. An update to the task block is received. The task is updated using the update to generate an updated task. The updated task is presented to one of the trade interface and the builder interface.

In general, in one or more aspects, the disclosure relates to a method implements a worksite information management system. A task corresponding to a worksite is updated to include a block. The task is presented to one of a worker interface, a trade interface, and a builder interface. An update to the task block is received. The task is updated using the update to generate an updated task. The updated task is presented to one of the trade interface and the builder interface with a plurality of tasks corresponding to a plurality of trades.

Other aspects of the invention will be apparent from the following description and the appended claims.

DETAILED DESCRIPTION

Figure 1A:
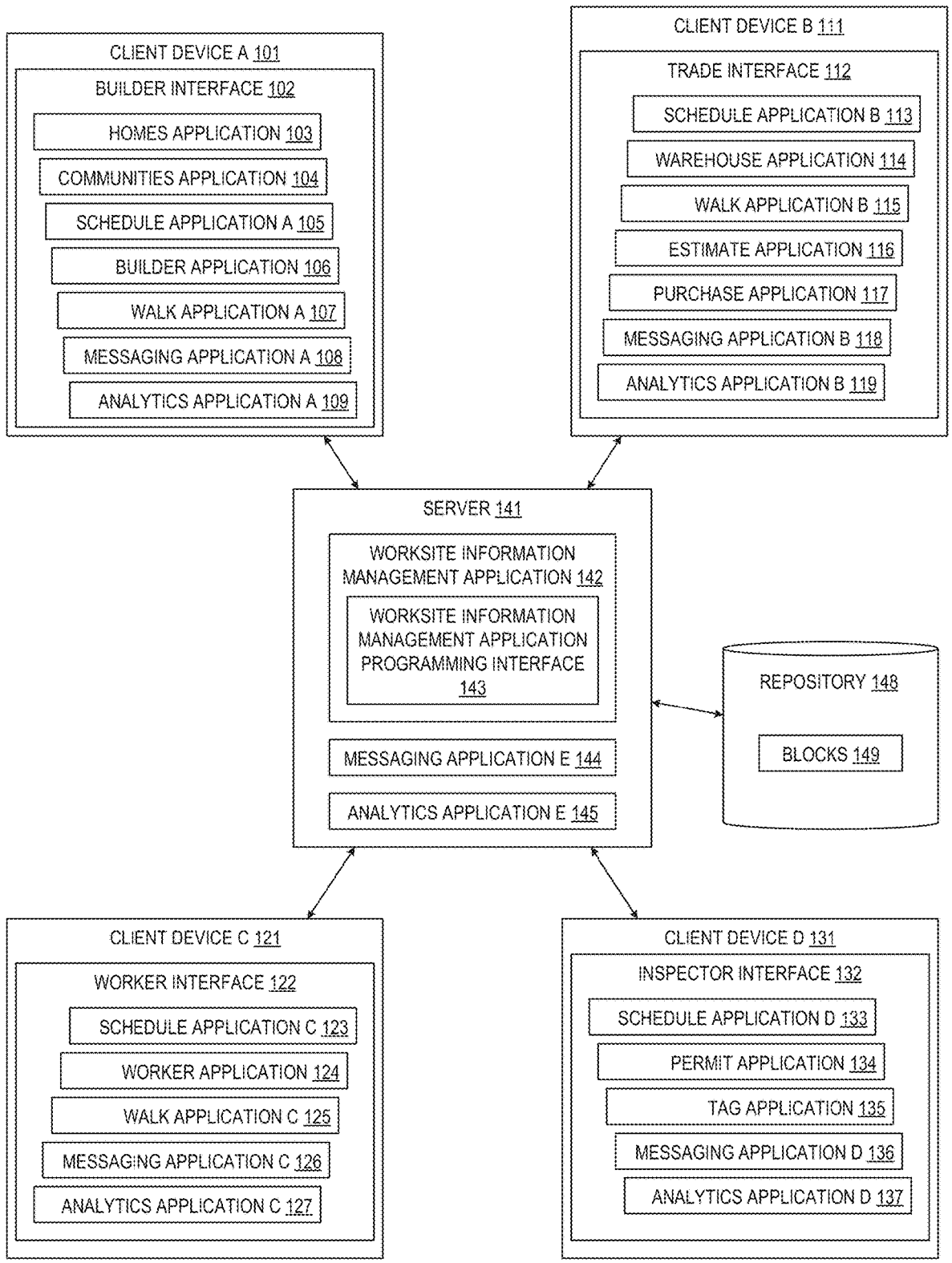
FIG. 1A, FIG. 1B, and FIG. 2 show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure automate scheduling and generate records for remote tracking, reviews, and inspections using a worksite information management system. The worksite information management system provides a suite of software products that integrate multiple independent entities of an industry providing live visibility, accountability, and automated scheduling. These features are available to each of the entities using the system giving the entities flexibility to work in the field or virtually without the need for physical interaction. The worksite information management system performs real-time reporting of industry specific metrics for each of the entities with the ability to see daily schedule variances of planned versus actual. Integrated alerts and messaging allow seamless connectivity to all entities for the users of the system. Optimized scheduling allows for just in time (JIT) material delivery resulting in increased ability to manage the scheduling and execution of jobs, reviews, and inspections at a worksite.

A job is a set of tasks that are performed at a worksite. A job may be part of a job bundle, which is a set of jobs that are performed at a worksite.

A worksite is a location where jobs are performed. For example, with the new home construction industry, a worksite is the location of the property on which the home is to be constructed.

Job information includes the data and records stored by the system for jobs performed at a worksite and may be stored using numeric and alphanumeric formats. Job information includes job identifiers, job type identifiers and descriptions, start dates, completion dates, job bundle identifiers, job status identifiers and descriptions, crew assignment identifiers, reviewer assignment identifiers, inspector identifiers, job dependency identifiers, job history descriptions, job triggers, job trigger actions, walk review result data, inspection result data, job results data, etc.

A trigger in the system is a record that identifies an action to take after an update is received. For example, receiving the home specification data and customizations may trigger the system to automatically generate schedule data with start dates and projected completion dates for the jobs, reviews, and inspections of a construction project.

Schedule information includes the data and records used by the system to identify the timing of events at a worksite and may be stored using numeric and alphanumeric formats. Schedule information includes job identifiers, schedule templates, job start dates, projected completion dates, job completion dates, crew assignment identifiers, reviewer identifiers, inspection identifiers, etc.

A schedule template is a record that may identify a set of tasks, the durations for the tasks, and the dependencies between the tasks. A builder may have several base model homes and each base model home may have a schedule template that identifies the tasks needed to construct the home along with the durations and dependencies of the tasks. After the specification of a home has been customized and approved, the schedule template may be updated to reflect the customizations.

A timestamp identifies a point in time using a number or string of characters. A timestamp may identify hours, minutes, seconds, milliseconds, month, day of month, day of week, week of year, year, etc., of a point in time and may be relative to another point in time.

Figure 1B:
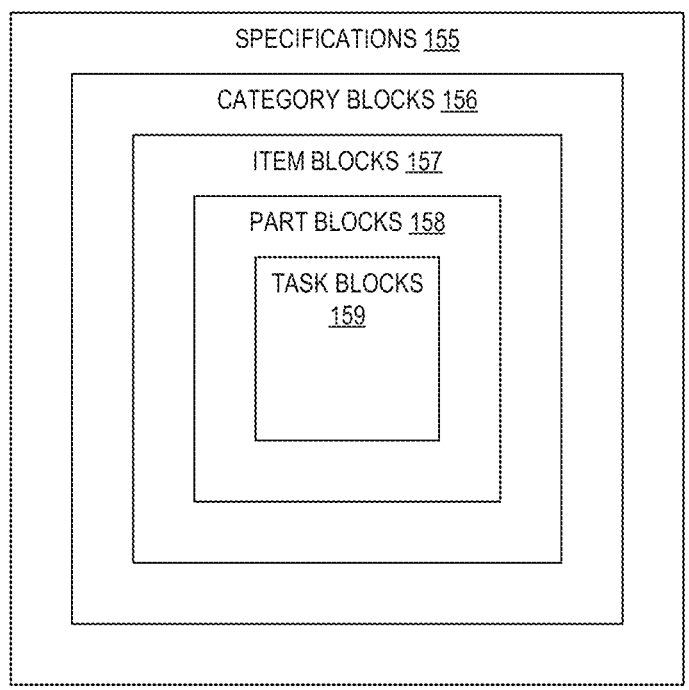
Figure 2:
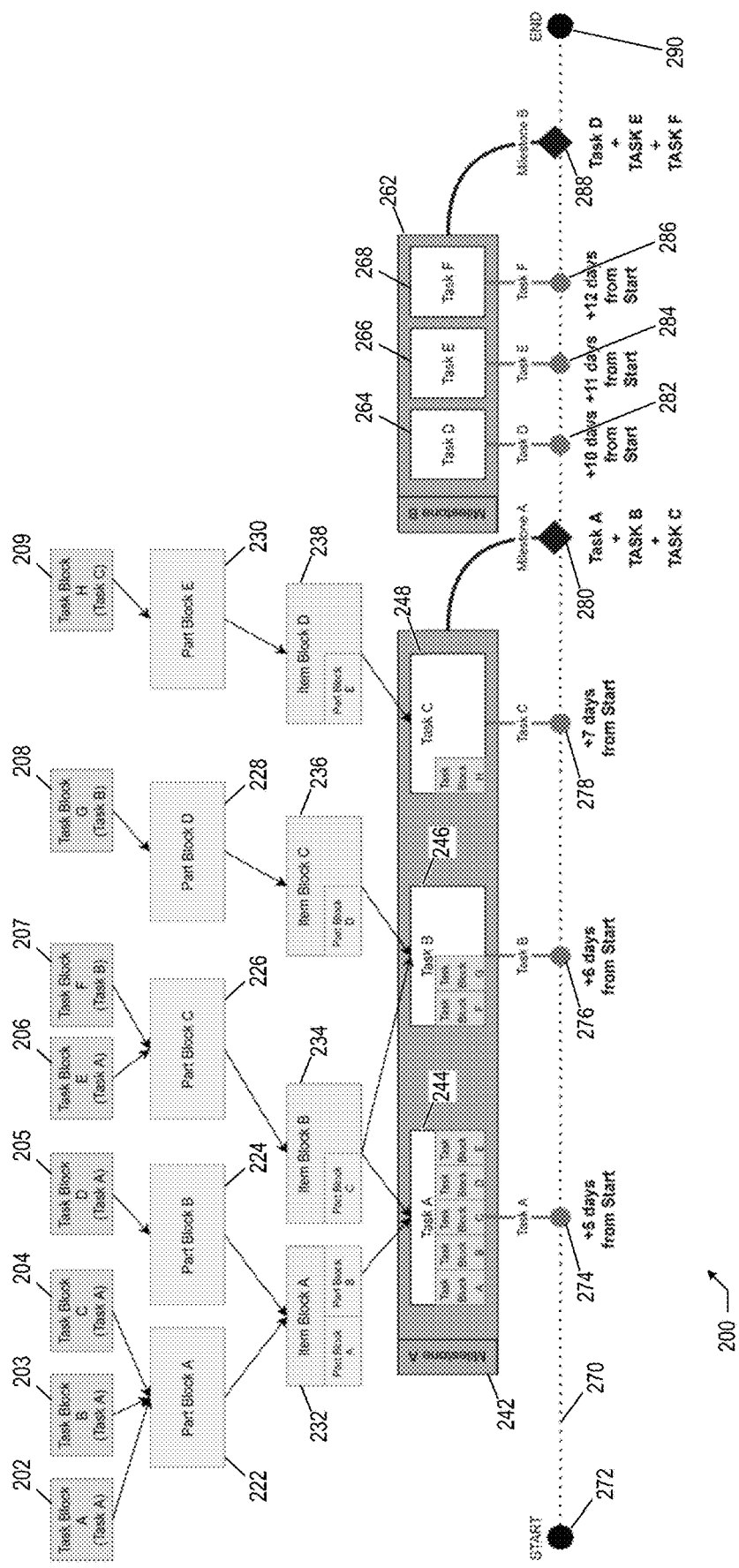

FIGS. 1A, 1B, and 2 show diagrams of embodiments that are in accordance with the disclosure. FIG. 1A shows the system (100) that implements a worksite information management system. FIG. 1B shows the blocks (149) that record data communicated throughout the system (100). FIG. 2 shows a timeline of a worksite information management system. The embodiments of FIGS. 1A, 1B, and 2 may be combined and may include or be included within the features and embodiments described in the other figures of the application. The features and elements of FIGS. 1A, 1B, and 2 are, individually and as a combination, improvements to worksite information management technology and computing systems. The various elements, systems, and components shown in FIGS. 1A, 1B, and 2 may be omitted, repeated, combined, and/or altered as shown from FIGS. 1A, 1B, and 2. Accordingly, the scope of the present disclosure should not be considered limited to the specific arrangements shown in FIGS. 1A, 1B, and 2.

Turning to FIG. 1A, the system (100) manages worksite information. The server (141) processes and communicates worksite information to the client devices A (101), B (111), C (121), and D (131) using the blocks (149) stored in the repository (148).

Figure 9A:
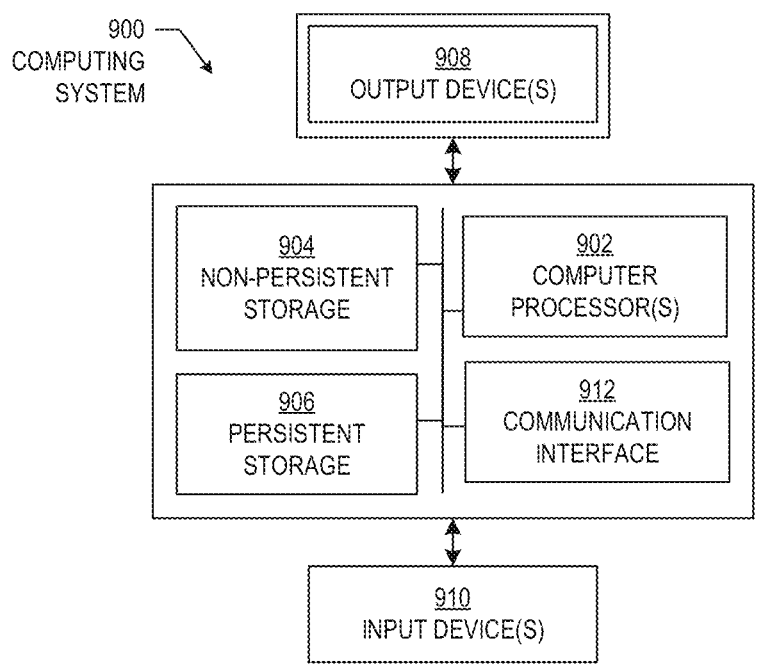
FIG. 9A and FIG. 9B show computing systems in accordance with disclosed embodiments.

The client devices A (101), B (111), C (121), and D (131) are computing systems (further described in FIG. 9A). For example, the client devices A (101), B (111), C (121), and D (131) may be desktop computers, mobile devices, laptop computers, tablet computers, etc.

The server (141) is a computing system (further described in FIG. 9A). The server (141) may include multiple physical and virtual computing systems that form part of a cloud computing environment. In one embodiment, execution of the programs and applications of server (141) is distributed to multiple physical and virtual computing systems in the cloud computing environment.

The interfaces (102), (112), (122), and (132) are interfaces to the applications running on the system (100). The interfaces (102), (112), (122), and (132) may be part of a native application or may be a browser application that sends and receives messages to and from the worksite information management application (142).

The builder interface (102) executes on the client device A (101) and is used by a builder to access the system to view and manipulate schedules, notifications, messages, etc. For example, a user of a builder may use the builder interface (102) to plan communities and schedule contractors to build houses.

The trade interface (112) executes on the client device B (111) and is used by a supervisor to access the system to view and manipulate schedules, notifications, messages, etc. For example, a supervisor of a contractor may use the trade interface (112) to access a machine learning model to schedule workers for a worksite.

The worker interface (122) executes on the client device C (121) and is used by a worker to access the system to view and manipulate schedules, notifications, messages, etc. For example, a worker may be at a worksite and use the worker interface (122) to identify that a task block is complete with evidence (e.g., a picture with geolocation coordinates).

The inspector interface (132) executes on the client device D (131) and is used by an inspector (e.g., a city inspector, a county inspector, etc.) to access the system to view and manipulate schedules, notifications, messages, etc. For example, an inspector may use the inspector interface (132) to review the evidence of the work performed at a worksite.

The interfaces (102), (112), (122), and (132) interactively display information from multiple applications running on the client devices A (101), B (111), C (121), and D (131) and the server (141). The applications running on the client devices A (101), B (111), C (121), and D (131) communicate with the worksite information management application (142) through the worksite information management application programming interface (143).

The homes application (103) operates on the client device A (101). The homes application (103) is used by a builder to generate, process and view the blocks used for the homes of a community. In one embodiment, the homes application (103) may operate on a client device of the home buyer and be used to access the data about the home (e.g., scheduling, part selections, etc.).

The communities application (104) operates on the client device A (101). The communities application (104) is used by a builder to plan and view the homes of communities of a builder.

The schedule applications A (105), B (113), C (123), and D (133) operate on the client devices A (101), B (111), C (121), and D (131). The schedule applications A (105), B (113), C (123), and D (133) show the schedules for the task blocks for the homes being built.

The builder application (106) operates on the client device A (101). The builder application (106) is used by the users of the builder to access the other applications through the builder interface (102).

The walk applications A (107), B (115), and C (125) operate on the client devices A (101), B (111), and C (121). The walk applications A (107), B (115), and C (125) display information used while a user is walking on the worksite to capture evidence (e.g., images) while at the worksite. The walk applications A (107), B (115), and C (125) may also be used to view the evidence away from the worksite.

The messaging applications A (108), B (118), C (126), and D (136) operate on the client devices A (101), B (111), C (121), and D (131) in conjunction with the messaging application E (144) operating on the server (141). The messaging applications A (108), B (118), C (126), D (136), and E (144) pass messages back and forth though the system to communicate and process data and information about the blocks (149). The other applications of the system (100) use the messaging applications A (108), B (118), C (126), D (136), and E (144) to transfer information in the system (100).

The analytics applications A (109), B (119), C (127), and D (137) operate on the client devices A (101), B (111), C (121), and D (131) in conjunction with the analytics application E (145) operating on the server (141). The analytics applications A (109), B (119), C (127), D (137), and E (145) display, communicate, and process analytics data through the system (100). The analytics data includes how often tasks, individuals, or companies are not completed on time, how often tasks, individuals, or companies do not pass inspection, etc. The analytics applications A (109), B (119), C (127), D (137), and E (145) may also use machine learning models to make predictions. For example, the analytics application E (145) may train a machine learning model to predict which worker will be selected for a task block.

The warehouse application (114) operates on the client device B (111). The warehouse application (114) is used by a supervisor to monitor and schedule shipments from warehouses to worksites.

The estimate application (116) operates on the client device B (111). The estimate application (116) is used by a contractor to provide estimates to builders (e.g., through the builder application (106)) for task blocks that may be performed by the contractor.

The purchase application (117) operates on the client device B (111). The purchase application (117) is used by a contractor to purchase supplies for a worksite.

The worker application (124) operates on the client device C (121). The worker application (124) is used by a worker to communicate with the contractor. For example, the worker application (124) may be used to communicate for why work may not be completed on time or to request additional information about a task block.

The permit application (134) operates on the client device D (131). The permit application (134) is used by an inspector to issue permits for tasks for a worksite. In one embodiment, the permit application (134) may also operate on the client device A (101) and be used by a user of a builder to request a permit.

The tag application (135) operates on the client device D (131). The tag application (135) is used by inspector to report and document building code violations for a worksite. For example, red tags may be for a set of building code violations that need to be remediated before construction can continue and green tags may be for certification that a stage meets building code.

The worksite information management application (142) is a collection of programs operating on the server (141) using the worksite information management application programming interface (143). The worksite information management application (142) may be implemented as a web application or service that communicates with the other applications using over a network.

In one embodiment, the worksite information management application (142) includes a web store of digital assets that hosts an online catalog where builders (using the builder interface (102)), municipalities (using the inspector interface (132)), and vendors (using the trade interface (112)) can browse sets of pre-populated construction blocks (e.g., the blocks (149)). The digital assets include designs and materials that can be imported into the plans and specifications maintained by the system (100). By using sets of established blocks traded through the web store, the system (100) ensures uniformity across the platform for the different devices and companies. Third parties may create and submit block packages to the marketplace where the block packages can be acquired by other users of the system (100).

The repository (148) is a computing system that may include multiple computing devices in accordance with the computing system (900) and the nodes (922) and (924) described below in FIGS. 9A and 9B. The repository (148) may be hosted by a cloud services provider that also hosts the server (141). The cloud services provider may provide hosting, virtualization, and data storage services as well as other cloud services and to operate and control the data, programs, and applications that store and retrieve data from the repository (148). The data in the repository (148) includes the blocks (149), which are further described below with FIGS. 1B and 2.

Turning to FIG. 1B, the blocks (149) store the information used by the system (100) (of FIG. 1A). The blocks (149) stored in the repository (148) (of FIG. 1A) include a hierarchy. The blocks (149) include the specifications (155), the category blocks (156), the item blocks (157), the part blocks (158) and the task blocks (159). The blocks (149) may be stored as electronic files on the repository (148) (of FIG. 1A).

The specifications (155) are digital representation of a list of tasks and items. A specification summarizes the building guidelines of a particular plan for a home. A specification is composed of multiple blocks generated by builders, municipalities, and vendors. A specification may be generated by a builder to correspond to a plan and then be customized by community (project/phase/community). Blocks or category blocks that are used by a municipality may be automatically added to a plan by the builder. After being generated, the specification may be transmitted to all vendors (also referred to as contractors) who receive bid requests. Once the specification is copied down to an account of a vendor, the vendor (e.g., through the trade interface (112) of FIG. 1A) may add additional blocks, category blocks, and items. The vendor may not remove or modify blocks created by the builder or municipality. The blocks (149) form a uniform way to standardize the building process from the bidding process to the individual construction phases throughout the entire home building process.

The category blocks (156) may be added to the specifications (155). Each specification may have multiple category blocks from the category blocks (156).

A series (a selection one or multiple specific parts) may be applied to a specification. Applying a series replaces placeholders within the specification with the selections in the series.

Individual specifications may be shared with vendors. As an example, a builder may use the builder interface (102) (of FIG. 1A) to generate specification that is transmitted to the trade interface (112) (of FIG. 1A) to share the specification with the vendor.

The specifications (155) may have versions that are identified with a version identifier. Multiple homes may use the same specification with the specification for each home being uniquely identified with a version identifier.

Changes to a specification may be pushed down to a vendor (e.g., to a contractor) while a task is in progress. For example, a plumbing vendor may have started work on a house and the specification is changed to specify a different faucet for installation into the home.

Builders and vendors may create templates for the specifications (155). The templates for the specifications (155) facilitate the creation of multiple specifications that may be the same for different homes. A template works like a specification that will let builders identify block selections that are missing in the current specification.

Specification templates may be shared. For example, different communities may have shared templates to build houses in the different communities using the same plans and blocks.

Specification templates may be acquired from a web store. The web store may be accessible to multiple builders through the builder interface (102) (of FIG. 1A).

Specification templates may be copied. For example, a specification may be copied from one community to another and may then be customized for the second community.

Changes to a specification template may be push to the plans created from the specification template. For example, a task in a specification template initially be estimated to take 1 day may be changed to take 2 days, which gets pushed out to each of the specifications and plans based on the template and using the task.

The blocks (149) are customizable templates for individual pieces that form a foundation for the worksite information management application (142) (of FIG. 1A). The blocks (149) provide a standard vehicle for data to be communicated between the different interfaces and devices of the system (100) (of FIG. 1A). Each block defines a single specific aspect or task of a job that, when combined, create a job specification. Each block may be composed of a variety of details including drawings, images, materials, placeholders, task steps. Builders, vendors, municipalities and other parties related to the construction process may create and customize blocks with individual specifications. The specifications (156) (containing a group of blocks) may be pushed down to vendors to request bids. Blocks sent to vendors (e.g., contractors) may be pushed to their vendors (e.g., to subcontractors). The blocks that are passed down to a vendor or related party may be added to but may not be changed by the vendor receiving the block. The blocks include (149) include the category blocks (156), the item blocks (157), the part blocks (158), and the task blocks (159).

The category blocks (156) are templates used to arrange multiple blocks into logical groups that can be assigned to a vendor trade class (e.g., to a plumber or electrician using the trade interface (112) of FIG. 1A). Once a category block (of the category blocks (156)) is added to a specification (of the specifications (155)) the category block may be customized to include the specific item blocks (from the item blocks (157)) for a job. The category blocks (156) may be added to specification templates to enable builders to quickly build out multiple specifications (of the specifications (155)) and to avoid missing key trades and cost codes used by a specification.

Each different type of trade (e.g., plumbing, electrical, HVAC (heating, ventilation, and air conditioning) may be part of a different category block. Separating the different trades into different category blocks allows for the costs of individual trades to be rolled up and determined independently.

The item blocks (157) are templates used to map parts and services to cost codes. Each item block may be assigned a cost code and contain a set of part blocks (from the part blocks (158)) that define what actions and materials are required for a job. The item blocks (157) may be created and customized individually by organizations using the system (100) and may also be shared through a web store.

The part blocks (158) are templates used to map specific placeholders, materials, and task blocks (from the task blocks (159)) to item blocks (from the item blocks (157)).

The part blocks (158) allow item costs to be rolled up into a single cost code for an item block from the item blocks (157).

Placeholders allow part blocks to specify material categories without having to specify the specific material. For example, a placeholder may be a generic faucet instead of referencing a specific faucet from the item master. Placeholders provide a unique ability for builders and trades to create a generic plan and then later use a series (a selection of specific parts) to override the placeholder items with specific items defined by the series.

The task blocks (159) are templates that define a set of steps that are added to scheduled tasks. By adding tasks blocks to a specification, the system (100) (of FIG. 1A) may automatically identify the tasks to be created for the jobs of the specification and apply automation rules for assignment and scheduling.

Turning to FIG. 2, shows the diagram (200) with the timeline (270). The diagram (200) shows relationships between the task blocks A (202) through H (209), the part blocks (222) through (230), the item blocks A (232) through D (238), the milestones A (242) and B (262), and the timeline (270). In one embodiment, the timeline (270) is generated by the system (100) (of FIG. 1A) and may be displayed on a client device connected to the system (100).

The different task blocks A (202) through H (209) are include as part of other blocks. The task blocks A (202), B (203), and C (204) are part of the part block A (222). The task block D (205) is part of the part block B (224). The task blocks E (206) and F (207) are part of the part block C (226). The task block G (208) is part of the part block D (228). The task block H (209) is part of the part block E (230). The task blocks E (206) and F (207) are part of the different tasks A (244) and B (246) and are each part of the same part block (C (226)) and the same item block (B (234)).

The part block A (222) and the part block B (224) are parts of the item block A (232). The part block C (226) is part of the item block B (234). The part block D (228) is part of the item block C (236). The part block E (230) is part of the item block D (238).

Tasks include multiple task blocks from the different item blocks and different part blocks. The task A (244) is formed from the item blocks A (232) and B (234) and includes task blocks A (202) through E (206). The task B (246) is formed from the item blocks B (234) and C (236) and includes the task blocks F (207) and G (208). The task C (248) is formed from the item block D (238) and includes the task block H (209).

The milestone A (242) includes the tasks A (244), B (246), and C (248). The milestone B (262) includes the tasks D (264), E (266), and F (268).

The timeline (270) displays icons to identify completion dates for the different tasks and milestones. The timeline (270) includes the starting point (272) and shows the icon (274) for the completion date of the task A (244), the icon (276) for the completion date of the task B (246), the icon (278) for the completion of the task C (248) and the icon (280) for the completion of the milestone A (242).

The timeline (270) also shows completion dates for the tasks D (264) through F (268) of the milestone B (262). The timeline (270) shows the icon (282) for the completion date of the task D (264), the icon (284) for the completion date of the task E (266), the icon (286) for the completion date of the task F (268), the icon (288) for the completion of the milestone B (262), and the icon (290) for the end of the project.

The icons (280) and (288) for the milestone a (242) and the milestone B (262) are placed on the timeline (270) after the completion dates of the tasks within those milestones to allow for additional time in case the tasks or task blocks are not completed as originally scheduled.

The system (100) (of FIG. 1A) may automatically generate the timeline (270) and the milestones A (242) and B (262) after receiving the tasks A (244) through F (268). The system (100) (of FIG. 1A) may identify task blocks corresponding to the tasks A (244) through F (268) by looking up the item blocks for each task, the part blocks for each item block, and the task blocks for each part block.

Figure 3:
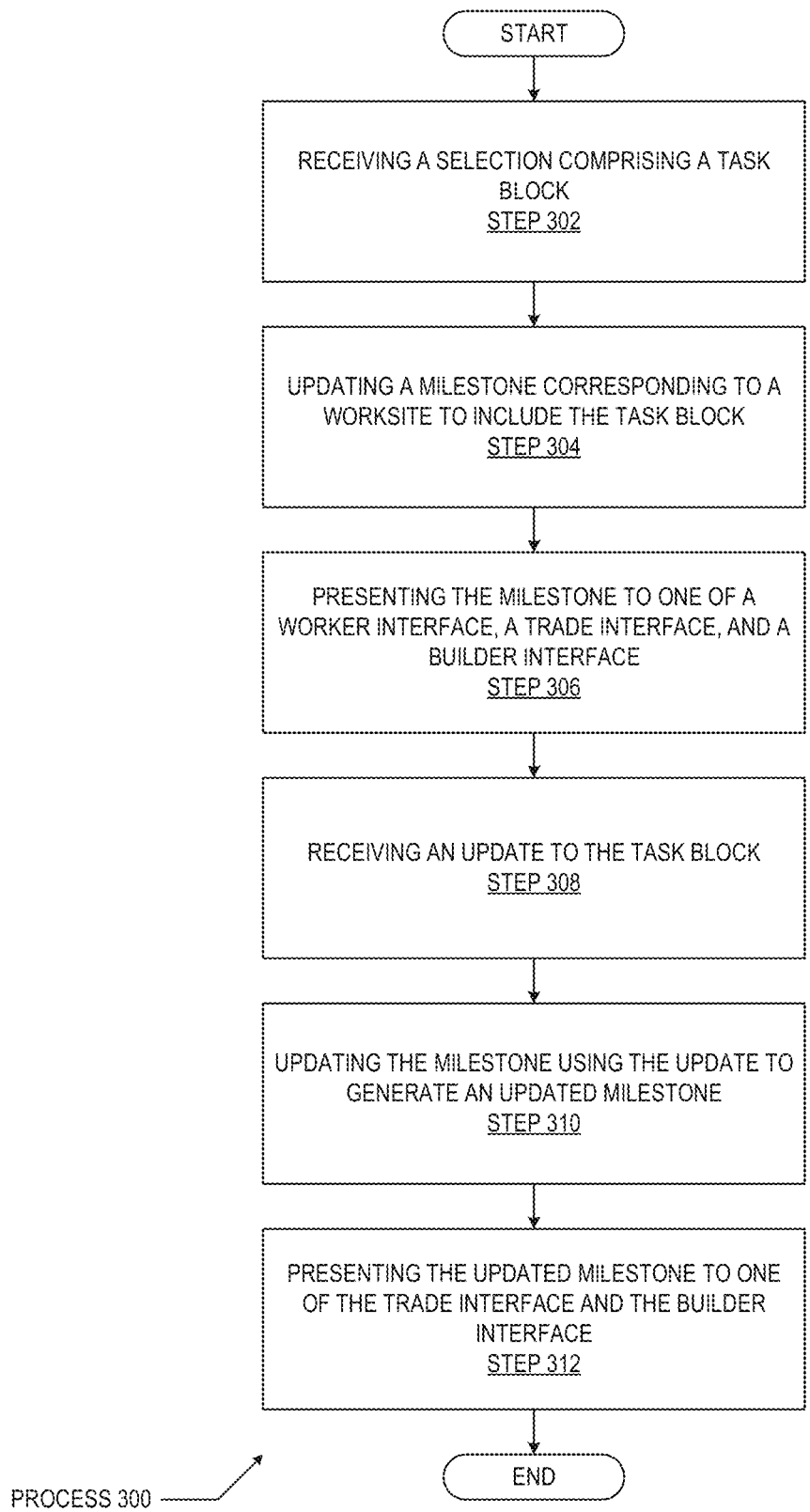
FIG. 3 shows a flowchart in accordance with disclosed embodiments.

FIG. 3 shows a flowchart of the process (300) in accordance with the disclosure. FIG. 3 is a flowchart of a method of a worksite information management system. The embodiments of FIG. 3 may be combined and may include or be included within the features and embodiments described in the other figures of the application. The features of FIG. 3 are, individually and as an ordered combination, improvements to worksite information management technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 3, the process (300) uses blocks to communicate information from bottom level workers up to contractors and builders. In one embodiment, the process (300) operates on a computing system that is part of a cloud computing environment.

At Step 302, a selection is received that includes a task block. The selection may be received by the system from a builder interface. The task block may identify a unit of work to be performed as part of a construction project, such as the construction of a house.

In one embodiment, the process (300) may receive preferences, generate schedules, transmit the schedules, and receive acknowledgements. Contractor timing preferences (identifying when task blocks are to be completed) and contractor crew preferences may be received from a client device operating a trade interface. Builder timing preferences and builder crew preferences may be received from a client device operating a builder interface. A schedule is generated by a server using task blocks, contractor timing preferences, contractor crew preferences, builder timing preferences, and builder crew preferences. The schedules may be transmitted to the client devices and interfaces that provided the preferences. Acknowledgements of the schedule are received from the client device and recorded to the repository.

In one embodiment, the task blocks are customized. The task blocks may be customized with trade interfaces, builder interfaces, and inspector interfaces operating on client devices. The task blocks may be customized to include computer aided design (CAD) files, material selections, instruction text, design selections, pictures, etc.

In on embodiment, a worker identifier for the task block is selected using a machine learning model. A naive bayes classifier may be used that utilizes the formula below.

$$P(Y|F_1, F_2, F_3, \ldots, F_n) =$$
$$P(Y|F_1)P(Y|F_2)P(Y|F_3) \ldots P(Y|F_n) = \prod_{i=1}^{n} P(Y|F_i) \quad \text{Eq. 1}$$

In one embodiment, the inputs to the machine learning model are a task type, a community identifier, a city identifier that identifies a city of the worksite, a builder identifier, a worksite type, a worksite address, a task schedule date, a day of week identifier, a list of scheduled tasks, an worker rating (identifying the quality of the work from the worker), etc. The output may be a prediction that is a percent likelihood that a worker will be chosen for the task block.

Different machine learning models may be used. For example, a neural network may be used with multiple hidden layers, convolutional layers, recurrent layers, fully connected layers, etc.

At Step 304, a task corresponding to a worksite is updated to include the task block. The task block may be included in the task by assigning an item block to the task. The item block may include a part block that includes the task block, which is included in the task.

In one embodiment, the task is updated to include a task that includes multiple task blocks. The task blocks may be from different item blocks and different part blocks.

At Step 306, the task is presented to one of a worker interface, a trade interface, and a builder interface. The task may be presented to the interfaces by transmitting hypertext markup language (HTML) code to the interfaces that are then rendered and displayed by the devices running the interfaces. Item blocks, tasks, and milestones may not have a specific relationship. For example, an item block ("toilet") may have tasks that correspond to three different milestones (e.g., "Rough", "Top-out", "Trim"). The task blocks (e.g., "Install Risers for Toilet Stack") are related to a task template (e.g., "Perform Rough Plumbing") that may be associated to a milestone (e.g., "Rough").

In one embodiment, the task is presented with an icon corresponding to a task that includes an item block that includes a part block that includes the task block. The icon may be displayed without displaying the park block and item block.

At Step 308, an update is received to the task block. The update may be received from a worker interface.

In one embodiment, the update is part of a progress update handled by the process (300). The process (300) receives progress updates, transmits alerts, receives view requests, and transmits schedule data. Progress updates of construction projects that include task blocks are received by the server. Alerts are transmitted based on the progress updates from the server to the interfaces of client devices. Requests to view progress of the construction projects are received from the client devices. Schedule data, incorporating the progress updates, is transmitted to the client devices responsive to the requests to view the progress.

In one embodiment, the process (300) uses geolocation information with the update. Geolocation definitions for a construction project that uses task blocks are received. Progress updates with geolocation information for the construction project may be received as part of the updates to the task blocks. The geolocation information from the progress updates are compared to the geolocation definitions to generate geolocation comparisons. Responses to the progress updates, based on the geolocation comparisons, are transmitting out to the interfaces of client devices.

In one embodiment, the update is receiving from the worker interface with an image. The image may be captured from the worksite with the worker interface.

In one embodiment, the update is received from the worker interface with an image that includes a plurality of overlays and a plurality of watermarks. The overlays and watermarks provide additional information and authenticity. Images that include the watermarks and overlays may be verified as authentic for reviews and inspections.

In one embodiment, the update is received from the trade interface with a highlight on an image captured from the worksite. The highlight may be added by a supervisor to indicate an issue with the work performed.

In one embodiment, the builder interface is notified in response to the update to the task block being received. The builder may be notified when an update delays completion of a task or milestone.

At Step 310, the task is updated using the update to generate an updated task. The task may be updated to show the task is completed on time, is being delayed, was completed but not on time, etc.

In one embodiment, the trade interface is notified in response to updating the task. For example, the trade interface may receive a notification that indicates the task is complete and is ready to be reviewed.

In one embodiment, updating the task includes rescheduling a subsequent task block of a subsequent task of a subsequent milestone. The subsequent task block, task, and milestone may have their respective completion dates delayed.

At Step 312, the updated task is presented to one of the trade interface and the builder interface. The updated task may be presented by transmitting the HTML code for the updated task to the interface of the client devices that render and display the updated task.

In one embodiment, the process (300) processes information and notifications for reviewers and inspectors. Reviewers may use the trade interface, work for a contractor, and review the work of a subcontractor. Inspectors may use the inspector interface, work for municipalities, and inspect the work performed at a worksite. A reviewer check-in message to initiate a review is received from a reviewer client device operating the trade interface. A review message including a work completion image is transmitted to the reviewer client device in response to the reviewer check-in message. The work completion image is captured at the worksite with a client device operating a worker interface. A review result is received from the reviewer client device in response to the review message. The review result includes a review completion image, which may be generated from the work completion image. An inspection notification is generated in response to the review result. An inspection start message is received from an inspector client device, operating an inspector interface, in response to the inspection notification. An inspection message, with the review completion image, is transmitted to the inspector client device in response to receiving the inspection start message. An inspection result is received from the inspector client device. The inspection result includes the result of the inspection (e.g., "PASS" or "FAIL").

In one embodiment, the updated task is presented with the task. Presenting the updated task with the original task shows the difference between the original scheduled dates and the current dates for the tasks for the worksite.

In one embodiment, the updated task is presented with the tasks corresponding to multiple trades. The tasks may be grouped by trades (framing, electrical, plumbing, etc.) and displayed on the same view with the updated task to show the progress of the different trades.

Figure 4A:
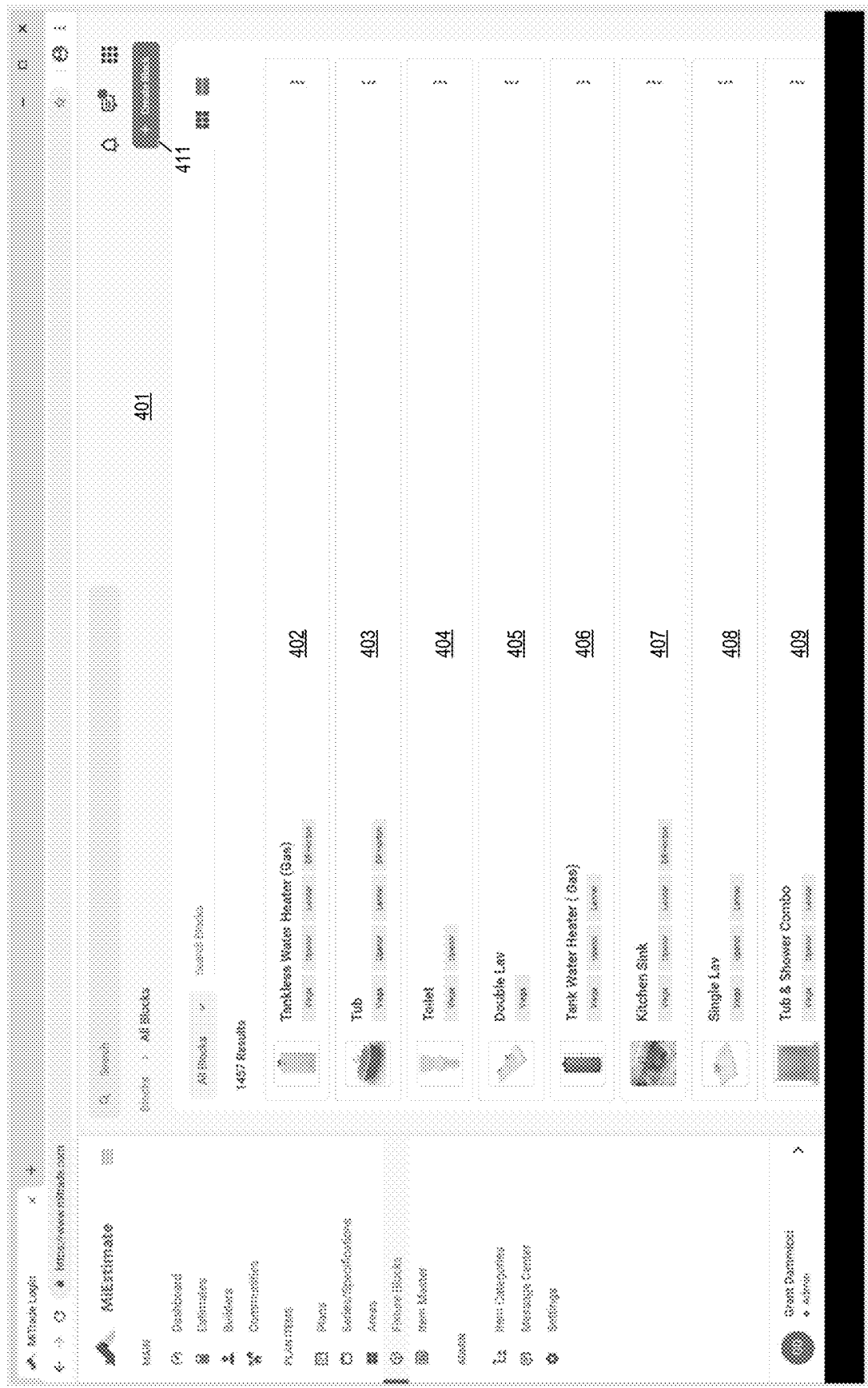
FIG. 4A, FIG. 4B, FIG. 4C, FIG. 4D, FIG. 4E, FIG. 5, FIG. 6A.
Figure 4B:
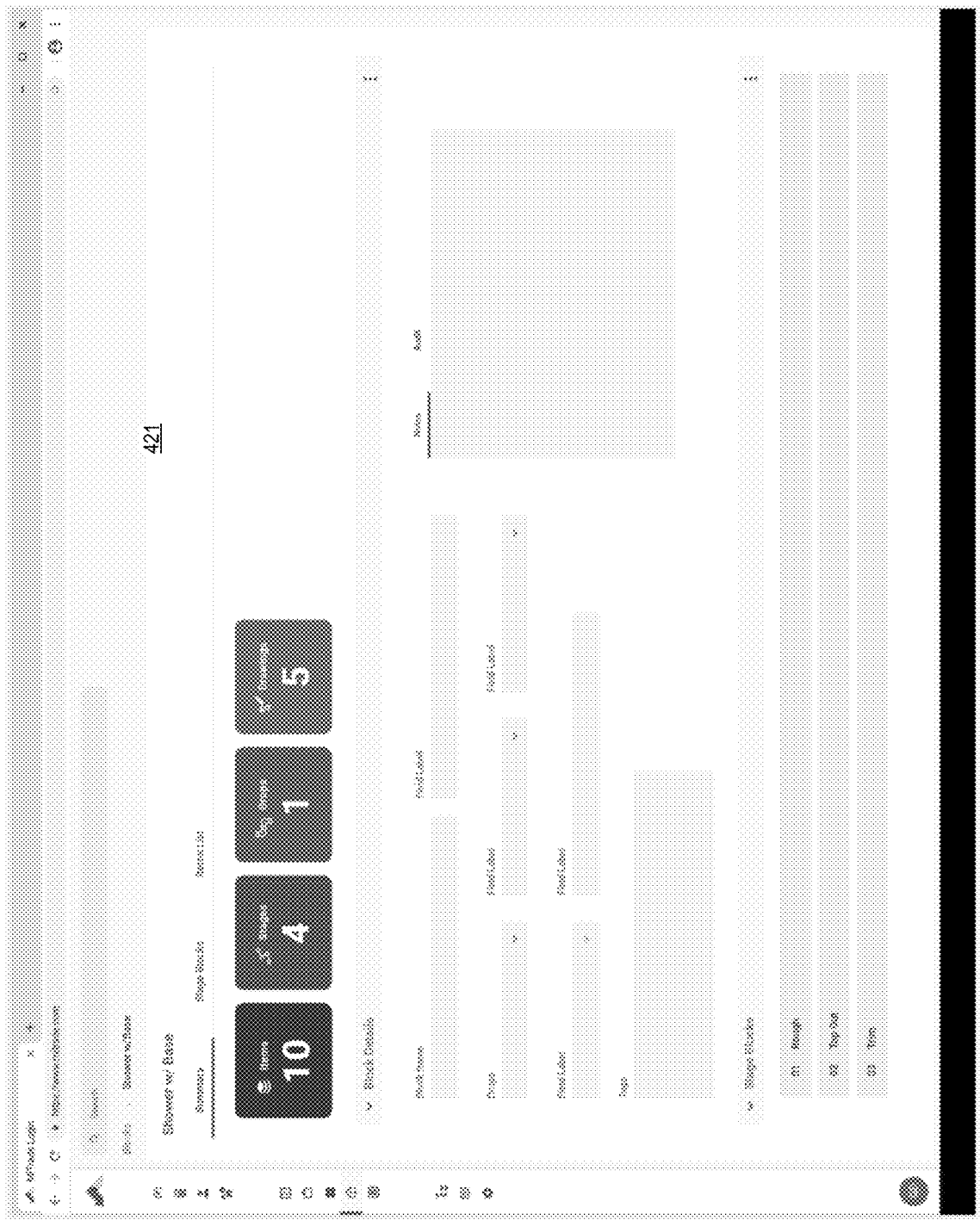
Figure 4C:
Figure 4D:
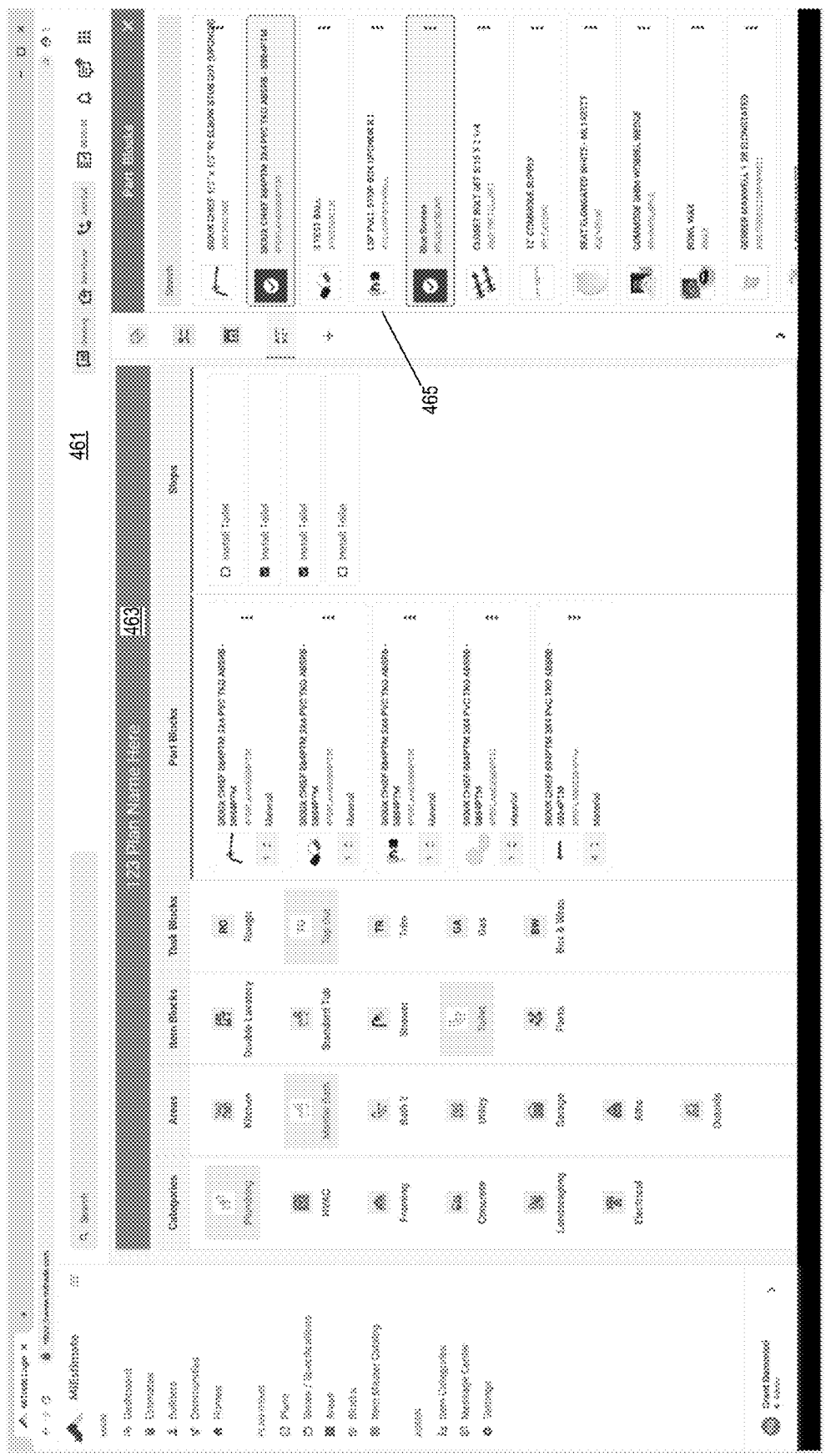
Figure 4E:
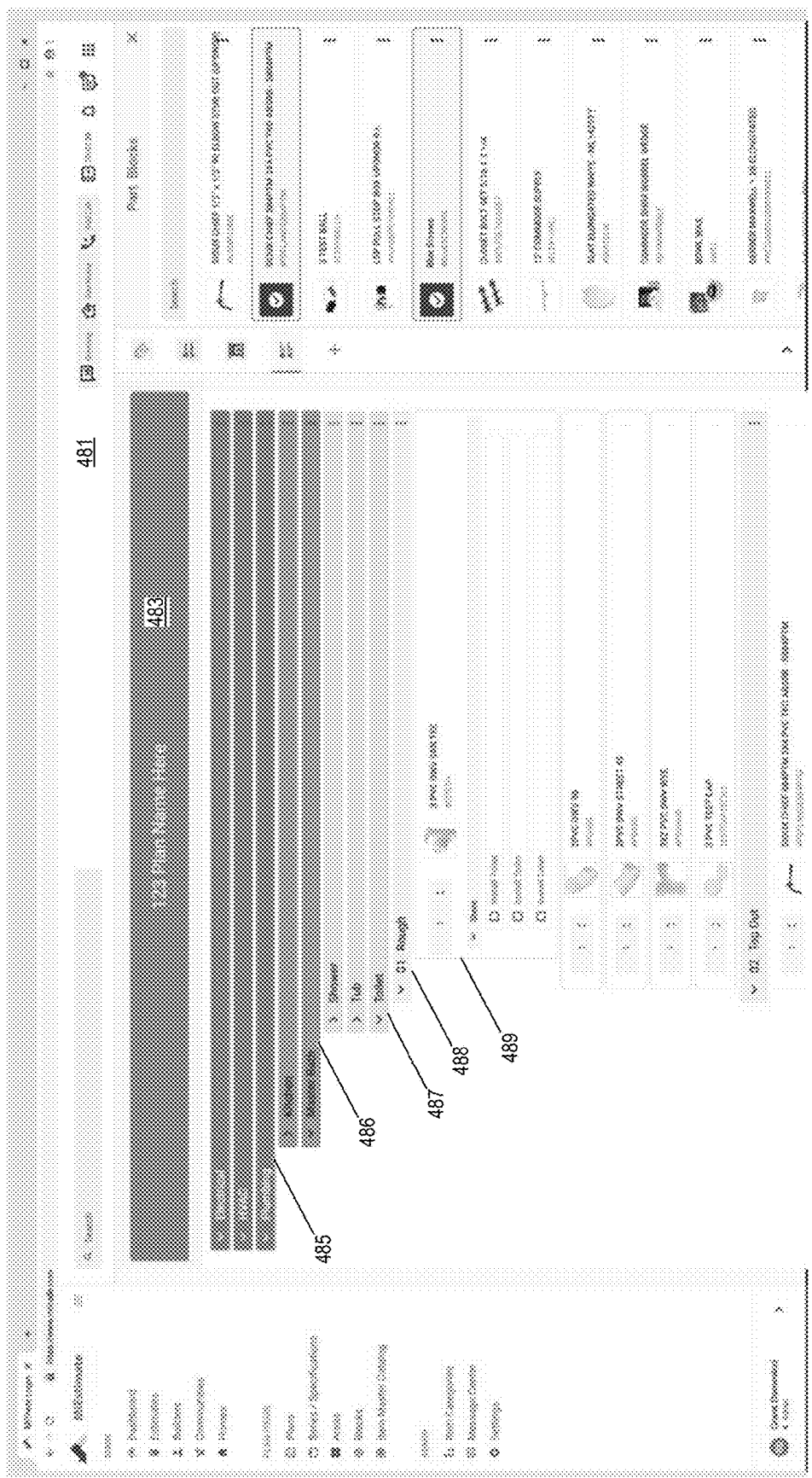
Figure 5:
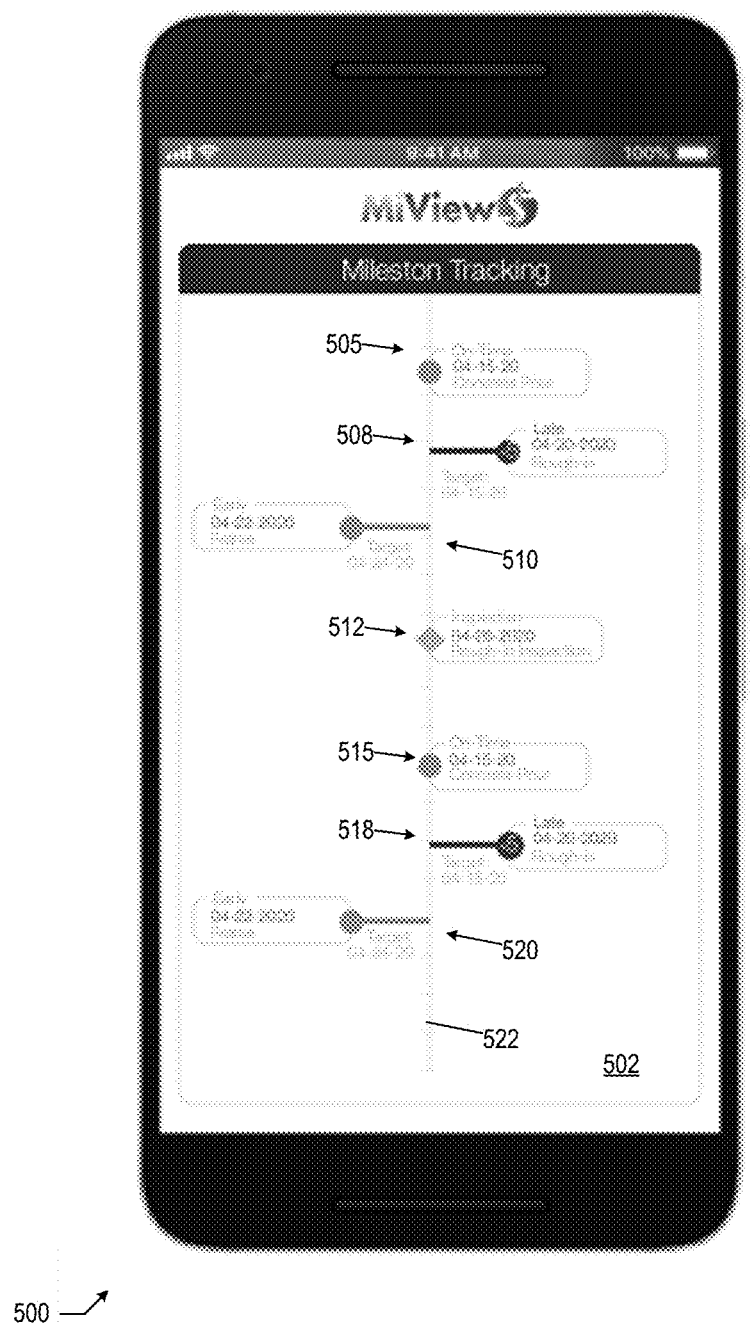
Figure 6B:
FIG. 6B, FIG. 7, and FIG. 8 show examples in accordance with disclosed embodiments.
Figure 6A:
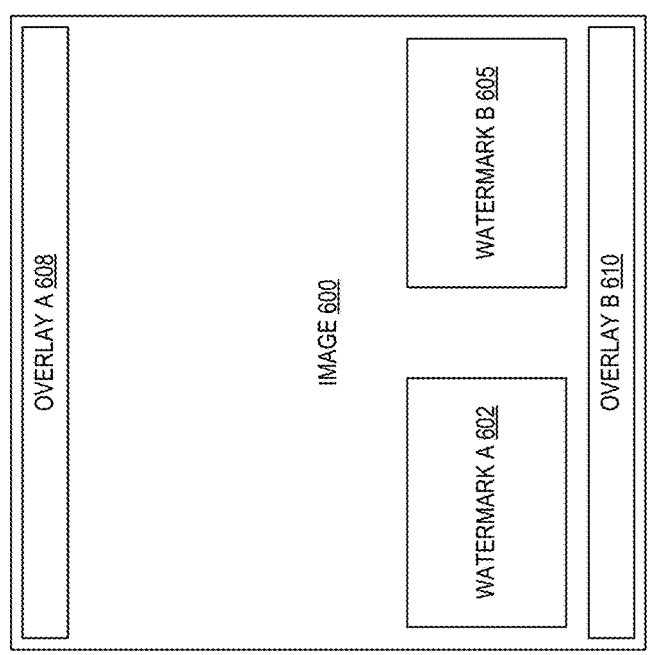
Figure 7:
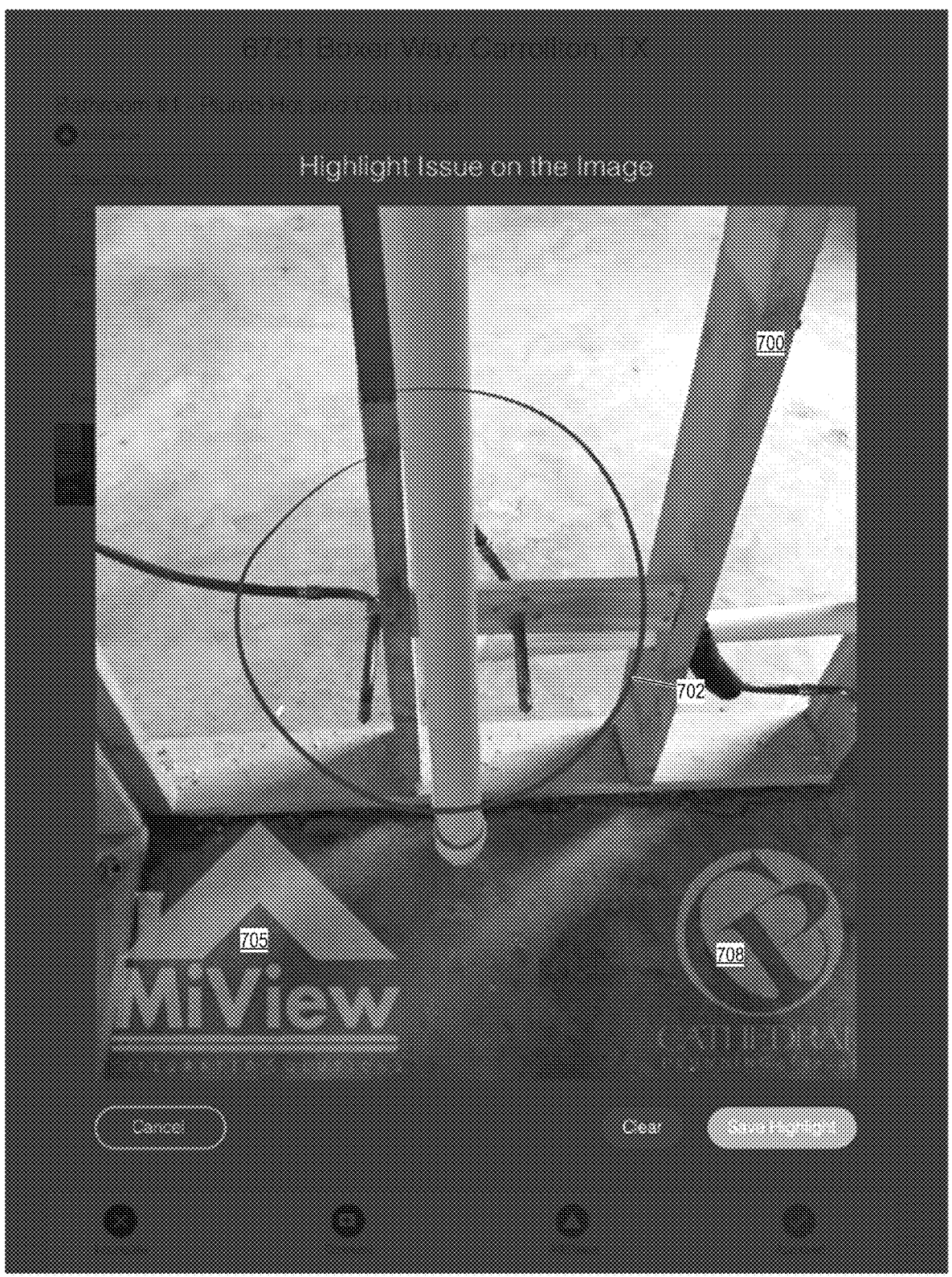
Figure 8:
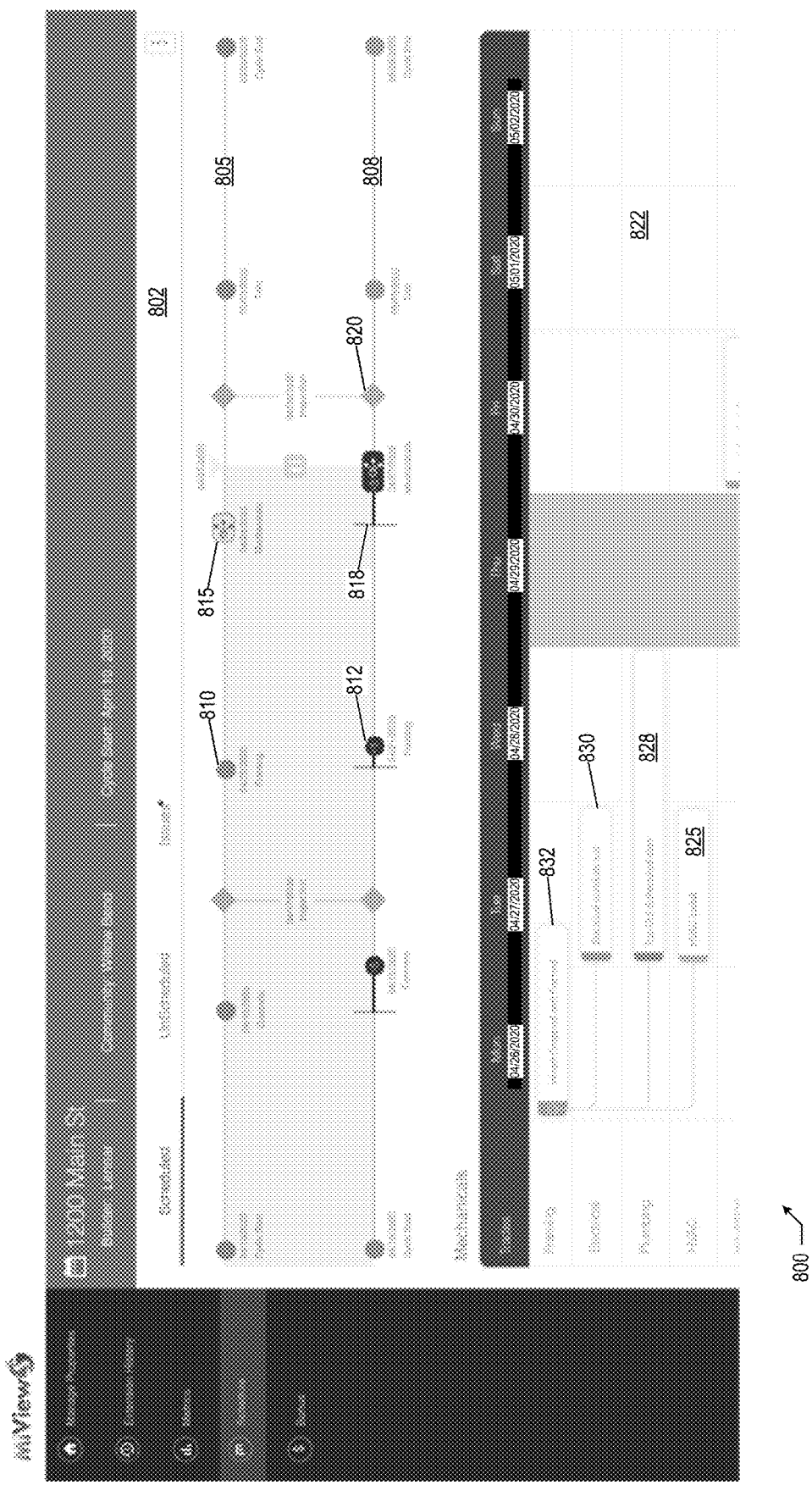

FIGS. 4A through 4E, 5, 6A through 6B, 7, and 8 show examples of interfaces and images used by worksite information management systems. FIGS. 4A through 4E show interfaces for creating and selecting blocks. FIG. 5 shows a milestone view. FIGS. 6A and 6B show a diagram and an image for evidence of task completion. FIG. 7 shows a highlighted image. FIG. 8 shows an updated milestone view. The embodiments shown in FIGS. 4A through 4E, 5, 6A through 6B, 7, and 8 may be combined and may include or be included within the features and embodiments described in the other figures of the application. The features and elements of FIGS. 4A through 4E, 5, 6A through 6B, 7, and 8 are, individually and as a combination, improvements to worksite information management technology and computing systems. The various features, elements, widgets, components, and interfaces shown in FIGS. 4A through 4E, 5, 6A through 6B, 7, and 8 may be omitted, repeated, combined, and/or altered as shown. Accordingly, the scope of the present disclosure should not be considered limited to the specific arrangements shown in FIGS. 4A through 4E, 5, 6A through 6B, 7, and 8.

FIGS. 4A through 4E depict interfaces used to generate blocks. The interfaces of FIGS. 4A through 4E may execute a part of builder interfaces and trade interfaces that operate on client devices.

Turning to FIG. 4A, the user interface (401) shows a list of the blocks (402), (403), (404), (405), (406), (407), (408), and (409). Each block of the blocks (402) through (409) correspond to an item block and may include multiple part blocks and task blocks. Selecting one of the blocks (402) through (409), or selecting the create block button (411), brings up an interface to edit the block.

Turning to FIG. 4B, the user interface (421) is used to create and edit a block. The block of the user interface (421) is for a shower with base ("Shower w/Base"). The block includes 10 item blocks that may each include multiple part and task blocks.

The block of the user interface (421) is linked to four stages. In one embodiment, each stage is a stage of building a house. For example, the stages for building a house may include the rough stage, the top out stage, the trim stage, etc.

The block of the user interface (421) is linked to one drop and five drawings. The number of drops is the multiplier for the cost associated with the block. The drawings show the items associated with the block and how the items should be installed.

Turning to FIG. 4C, the user interface (441) is used to add part blocks to item blocks. The "Toilet" item block has been selected. Part blocks from the window (443) may be added to the "Toilet" item block to the different stages ("Rough", "Top Out", "Trim", etc.). Each stage may include several parts.

Turning to FIG. 4D, the user interface (461) is used to add category blocks, item blocks, and part blocks to specifications. The window (463) shows a specification with different icons for the different types of blocks that may be added. The window (465) shows part blocks that may be added to the specification by dragging and dropping the part blocks.

Turning to FIG. 4D, the user interface (481) is another interface to add blocks to a specification. The user interface (481) groups the blocks by categories ("Electrical", "HVAC", "Plumbing", etc.) that correspond to the category blocks that may be part of specification. The interface element (485) for the plumbing category is selected to reveal the areas (e.g., "Kitchen", "Master Bath", etc.) that fall under the plumbing category. The interface element (486) is selected for the "Master Bath" to show the items (corresponding to item blocks) for the "Master Bath" area (which include "Shower", "Tub", "Toilet", etc.). The interface element (487) is selected, which reveals the stages (e.g., "Rough" and "Top Out") in which the selected item has parts (part blocks) that are to be installed. The interface element (488) is selected for the "Rough" stage, which includes several parts for the "Toilet" item. The interface element (489) is selected to show the steps (task blocks) for installing the part of the item.

Turning to FIG. 5, the mobile device (500) shows the milestone view (502). The milestone view (502) shows the interface elements (505) through (520) on the timeline (522).

The interface element (505) includes a green icon on the timeline (522). The interface element (505) shows that the "Concrete Pour" task was completed "On-Time".

The interface element (508) includes a red icon extending to the right of the timeline (522). The interface element (508) shows that the "Rough-in" task was completed "Late" (five days after of the target date of Apr. 15, 2020).

The interface element (510) includes a green icon extended into the left of the timeline (522). The interface element (510) shows that the "Frame" task was completed "Early" (two days ahead of the target date of Apr. 24, 2020).

The interface element (512) identifies an inspection. The icon is a different shape (a diamond instead of a circle), includes an exclamation point, and is colored yellow to identify the importance of the inspection. Without passing the inspection, the subsequent tasks cannot be started. The interface element (512) shows that the inspection happened on Apr. 26, 2020.

The interface elements (515), (518), (520) show additional tasks. The task for the interface elements (515) is "On-Time", the task for the interface elements (518) is "Late" by five days, and the task for the interface element (520) is "Early" by two days.

FIGS. 6A and 6B show a diagram of and an example image used by the system. The images captured and used by the system are the evidence to show that work has been completed and may be used to pass inspections.

Turning to FIG. 6A, the image (600) includes the watermarks A (602) and B (605) and includes the overlays A (608) and B (610). The watermarks A (602) and B (605) may be robust (resistant to transformations) and perceptible (noticeable on screen) digital watermarks. The overlays A (608) and B (610) may be transparent and include additional text corresponding to the image (600). The overlays A (608) and B (610) may include an address of the worksite or geolocation of the client device, which may be compared to a geolocation definition for the worksite.

Turning to FIG. 6B, the image (650) was captured at a worksite and shows evidence of performance of a task that is being tracked by the system. The image (650) includes the watermarks (652) and (655) and includes the overlays (658) and (660).

The watermark (652) identifies the entity that maintains the worksite information management system. The watermark (655) identifies the contractor that is responsible for performing the work.

The overlay (658) identifies the builder ("Clearview"), the physical address of the worksite ("(7580) SEVIE LN), the community ("Windsor") of the home, and the task ("T/O Layout"). The overlay (660) includes a description ("Mark gas service location"), identifies an area ("Utility Room"), and includes a timestamp of when the image (650) was captured.

Turning to FIG. 7, the image (700) includes the highlight (702) and the watermarks (705) and (708). The highlight (702) is a circle around a portion of the image (700) that identifies an issue with the work performed at the worksite. For example, the hot and cold lines may be backwards. The watermark (705) identifies the entity that maintains the worksite information management system. The watermark (708) identifies the contractor that is responsible for performing the work.

The highlight (702) may be created by a supervisor of the contractor using a trade interface on a client device. The image (700) may then be transmitted back to the worker to resolve the issue after viewing the image (700) with a worker interface on a client device.

Turning to FIG. 8, the interface (800) shows a milestone view (802) and category view (822). The interface (800) may be displayed through a web interface on a client device (personal computer, laptop computer, tablet computer, etc.) using a browser.

The milestone view (802) shows the original timeline (805) and the actual timeline (808). The interface element (810) indicates that the "Framing" task was originally scheduled to be completed on April 20. The interface element (812) indicates that the "Framing" task completed a day late (on April 21).

In response to the "Framing" task completing a day late, the system may have updated the "Mechanicals" task to complete on a later date, April 24. Additionally, the system may have automatically identified that the original worker would not be able to complete the "Mechanicals" task (due to other tasks scheduled for the worker) and assigned a different worker to perform the "Mechanicals" task.

The interface element (818) shows the completion of the "Mechanicals" task. The "Mechanicals" task was completed three days late, but still before the scheduled inspection identified by the interface element (820).

The category view (822) shows the different categories ("Framing", "Electrical", "Plumbing", "HVAC", etc.) along with the tasks for those categories during a week. The category view (822) may show a weekly view that is loosely coupled to the dates in the milestone view (802). For example, selecting the interface element (820) may set the week displayed in the category view (822) to include the day for the inspection. In the category view (822), the day for the inspection may be highlighted yellow to match the color of the icon in the milestone view for the interface element (820). The category view (822) shows the interface elements (825) and (828), receptively for "HVAC" and "Plumbing" with a green highlight color to indicate that the respective tasks have been completed. The interface element (830) is shown with a highlight color of blue to indicate that the task has not yet been completed. The highlight colors for the interface elements (825) through (830) are shown to the left of the text in the interface elements (825) through (830).

The interface element (832) is shown with an orange highlight. The orange highlight indicates that the tasks have been completed. The interface element (832) is highlighted orange to indicate that other tasks are dependent upon the task represented by the interface element (832). For example, the tasks of the interface elements (825), (828), and (830) depend on the task of the interface element (832).

Embodiments of the invention may be implemented on a computing system. Any combination of a mobile, a desktop, a server, a router, a switch, an embedded device, or other types of hardware may be used. For example, as shown in FIG. 9A, the computing system (900) may include one or more computer processor(s) (902), non-persistent storage (904) (e.g., volatile memory, such as a random access memory (RAM), cache memory), persistent storage (906) (e.g., a hard disk, an optical drive such as a compact disk (CD) drive or a digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (912) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (908), such as a screen (e.g., a liquid crystal display (LCD), a plasma display, a touchscreen, a cathode ray tube (CRT) monitor, a projector, or other display device), a printer, an external storage, or any other output device. One or more of the output device(s) (908) may be the same or different from the input device(s) (910). The input and output device(s) (910 and 908) may be locally or remotely connected to the computer processor(s) (902), non-persistent storage (904), and persistent storage (906). Many different types of computing systems exist, and the aforementioned input and output device(s) (910 and 908) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or a group of nodes combined may correspond to the computing system (900) shown in FIG. 9A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Figure 9B:
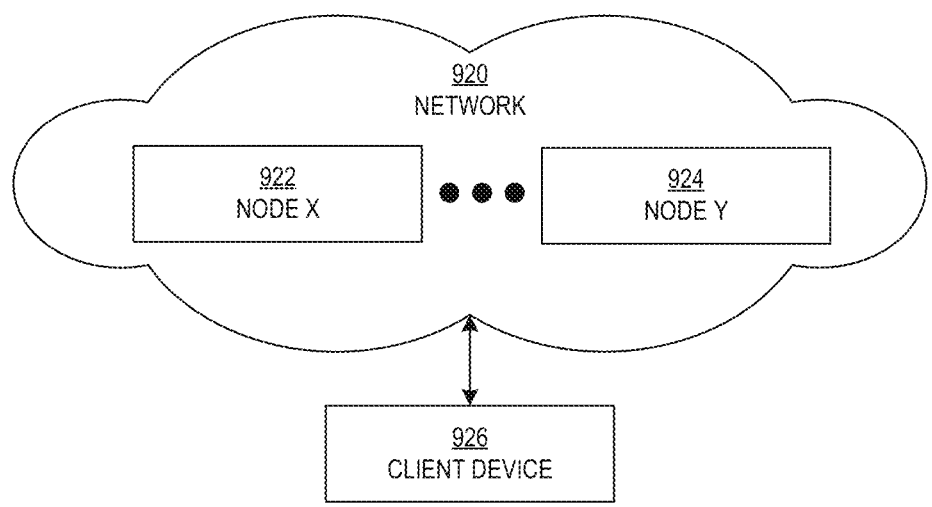

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of one or more embodiments of the invention.

The computing system (900) or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (900) of FIG. 9A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, from a builder interface, a selection comprising a task block;
generating, by a server application, a task, corresponding to a worksite, to include the task block, wherein the task block stored to an electronic file;
presenting the task to one of a worker interface, a trade interface, and the builder interface;
receiving, from the worker interface, an image captured from the worksite with the worker interface of work performed at the worksite, wherein the image includes an overlay and a watermark;
receiving, from the trade interface, an update to the task block, wherein the update comprises the image, received from the worker interface, with a highlight that identifies an issue with the work performed at the worksite;
processing, by the server application, the task using the update to the task block to generate an updated task responsive to the image; and
presenting the updated task, wherein the builder interface displays the updated task in one of a milestone view and category view.

2. The method of claim 1, further comprising:
receiving contractor timing preferences and contractor crew preferences;
receiving builder timing preferences and builder crew preferences;
generating a schedule using the task block, the contractor timing preferences, the contractor crew preferences, the builder timing preferences, and the builder crew preferences;
transmitting the schedule to a client device; and
receiving an acknowledgement of the schedule from the client device.

3. The method of claim 1, further comprising:
receiving a progress update of a construction project comprising the task block;
transmitting an alert based on the progress update;
receiving a request to view progress of the construction project from a client device; and
transmitting schedule data incorporating the progress update to the client device.

4. The method of claim 1, further comprising:
receiving a geolocation definition for a construction project comprising the task block;
receiving a progress update with geolocation information for the construction project;
comparing the geolocation information from the progress update to the geolocation definition to generate a geolocation comparison; and
transmitting a response to the progress update based on the geolocation comparison.

5. The method of claim 1, further comprising:
receiving, from a reviewer client device operating the trade interface, a reviewer check-in message to initiate a review;
transmitting a review message comprising a work completion image to the reviewer client device in response to the reviewer check-in message;
receiving a review result from the reviewer client device in response to the review message, the review result comprising a review completion image;
generating an inspection notification in response to the review result;

receiving an inspection start message from an inspector client device, operating an inspector interface, in response to the inspection notification;
transmitting an inspection message with the review completion image to the inspector client device in response to receiving the inspection start message; and
receiving an inspection result from the inspector client device.

6. The method of claim 1, further comprising:
customizing, with one of the trade interface, the builder interface, and an inspector interface, the task block to include one or more of a computer aided design (CAD) file, a material selection, instruction text, a design selection, a picture.

7. The method of claim 1, further comprising:
presenting the task with an icon corresponding to a task comprising an item block comprising a part block comprising the task block.

8. The method of claim 1, further comprising:
receiving, from the worker interface, the update with an image comprising a plurality of overlays and a plurality of watermarks.

9. The method of claim 1, further comprising:
notifying the trade interface in response to updating the task.

10. The method of claim 1, further comprising:
notifying the builder interface in response to receiving the update to the task block.

11. The method of claim 1, further comprising:
updating the task corresponding to the worksite to include a task comprising a plurality of task blocks, wherein the plurality of task blocks includes the task block.

12. The method of claim 1, further comprising:
updating the task includes rescheduling a subsequent task block of a subsequent task of a subsequent milestone.

13. The method of claim 1, further comprising:
presenting the updated task with the task.

14. The method of claim 1, further comprising:
presenting the updated task with a plurality of tasks corresponding to a plurality of trades.

15. The method of claim 1, further comprising:
selecting a worker identifier for the task block using a machine learning model.

16. A system comprising:
a server comprising an application;
the application, executing on the server and configured for:
  receiving, from a builder interface, a selection comprising a task block;
  generating, by the application, a task, corresponding to a worksite, to include the task block, wherein the task block stored to an electronic file;
  presenting the task to one of a worker interface, a trade interface, and the builder interface;
  receiving, from the worker interface, an image captured from the worksite with the worker interface of work performed at the worksite, wherein the image includes an overlay and a watermark;
  receiving, from the trade interface, an update to the task block, wherein the update comprises the image, received from the worker interface,
  with a highlight that identifies an issue with the work performed at the worksite;
  processing, by the application, the task using the update to the task block to generate an updated task responsive to the image; and
  presenting the updated task, wherein the builder interface displays the updated task in one of a milestone view and category view.

17. The system of claim 16, wherein the application is further configured for:
presenting the task with an icon corresponding to a task comprising an item block comprising a part block comprising the task block.

18. The system of claim 16, wherein the application is further configured for:
receiving, from the worker interface, the update with an image comprising a plurality of overlays and a plurality of watermarks.

19. The system of claim 16, wherein the application is further configured for:
notifying the trade interface in response to updating the task.

20. The system of claim 16, wherein the application is further configured for:
notifying the builder interface in response to receiving the update to the task block.

21. The system of claim 16, wherein the application is further configured for:
receiving contractor timing preferences and contractor crew preferences;
receiving builder timing preferences and builder crew preferences;
generating a schedule using the task block, the contractor timing preferences, the contractor crew preferences, the builder timing preferences, and the builder crew preferences;
transmitting the schedule to a client device; and
receiving an acknowledgement of the schedule from the client device.

22. The system of claim 16, wherein the application is further configured for:
receiving a progress update of a construction project comprising the task block;
transmitting an alert based on the progress update;
receiving a request to view progress of the construction project from a client device; and
transmitting schedule data incorporating the progress update to the client device.

23. The system of claim 16, wherein the application is further configured for:
receiving a geolocation definition for a construction project comprising the task block;
receiving a progress update with geolocation information for the construction project;
comparing the geolocation information from the progress update to the geolocation definition to generate a geolocation comparison; and
transmitting a response to the progress update based on the geolocation comparison.

24. The system of claim 16, wherein the application is further configured for:
receiving, from a reviewer client device operating the trade interface, a reviewer check-in message to initiate a review;
transmitting a review message comprising a work completion image to the reviewer client device in response to the reviewer check-in message;
receiving a review result from the reviewer client device in response to the review message, the review result comprising a review completion image;
generating an inspection notification in response to the review result;

receiving an inspection start message from an inspector client device, operating an inspector interface, in response to the inspection notification;

transmitting an inspection message with the review completion image to the inspector client device in response to receiving the inspection start message; and receiving an inspection result from the inspector client device.

25. The system of claim 16, wherein the application is further configured for:

customizing, with one of the trade interface, the builder interface, and an inspector interface, the task block to include one or more of a computer aided design (CAD) file, a material selection, instruction text, a design selection, a picture.

26. A method comprising:

generating, by a server application, a task, corresponding to a worksite, to include a task block, wherein the task block stored to an electronic file;

presenting the task to one of a worker interface, a trade interface, and a builder interface;

receiving, from the worker interface, an image captured from the worksite with the worker interface of work performed at the worksite, wherein the image includes an overlay and a watermark;

receiving, from the trade interface, an update to the task block, wherein the update comprises the image, received from the worker interface, with a highlight that identifies an issue with the work performed at the worksite;

processing, by a server application, the task using the update to the task block to generate an updated task responsive to the image; and, presenting the updated task, wherein the builder interface displays the updated task in one of a milestone view and category view.

\* \* \* \* \*